Figure 1:
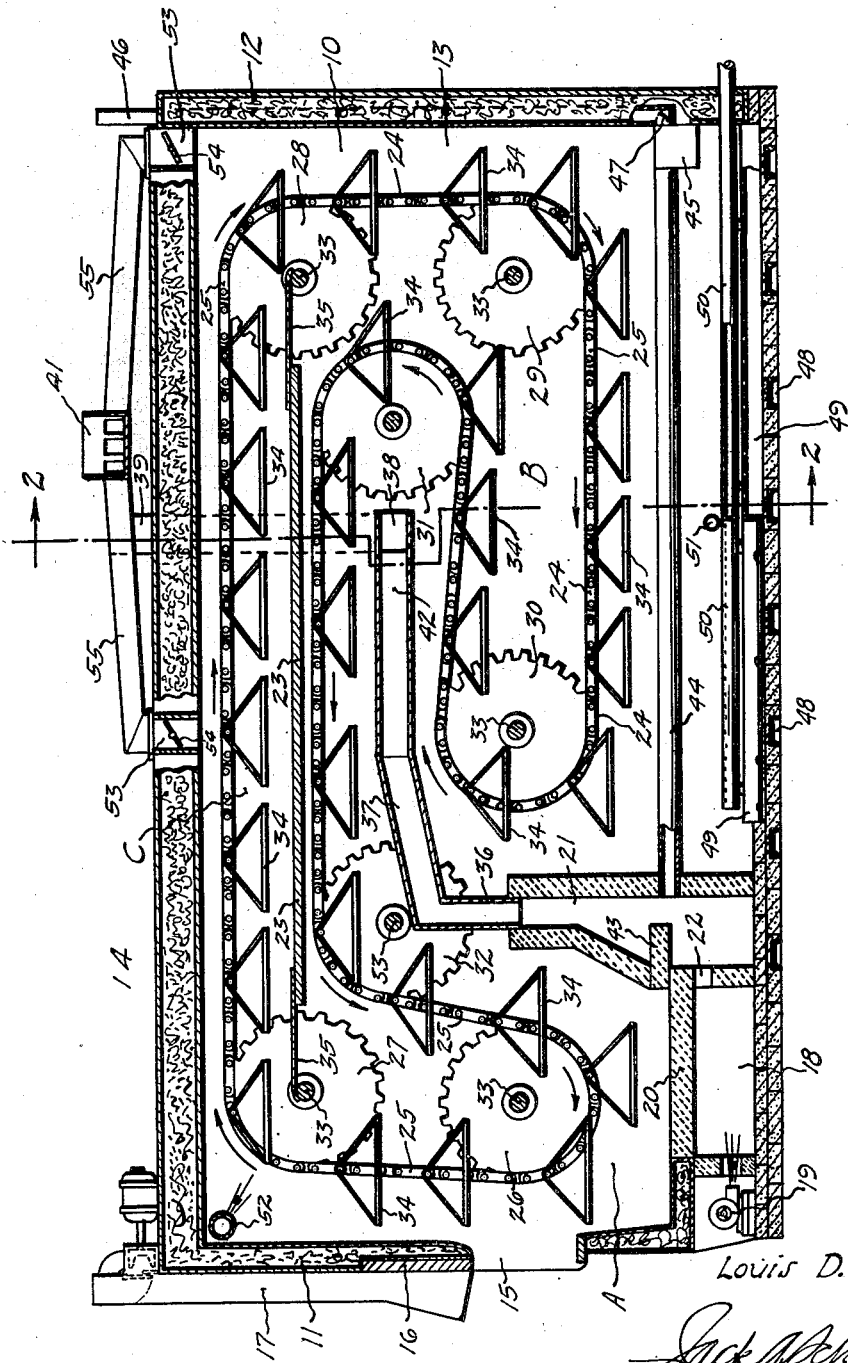

April 30, 1935.  L. D. HOULIS  1,999,503
MEANS FOR BAKING ARTICLES OF FOOD
Filed Feb. 27, 1933  2 Sheets-Sheet 1

Inventor
Louis D. Houlis
By Jack A. Ackley
Attorney

April 30, 1935.　　　L. D. HOULIS　　　1,999,503
MEANS FOR BAKING ARTICLES OF FOOD
Filed Feb. 27, 1933　　　2 Sheets-Sheet 2

Inventor
Louis D. Houlis

Jack A. Ashley
Attorney

Patented Apr. 30, 1935

1,999,503

UNITED STATES PATENT OFFICE 1,999,503

MEANS FOR BAKING ARTICLES OF FOOD

Louis D. Houlis, Dallas, Tex.

Application February 27, 1933, Serial No. 658,761

3 Claims. (Cl. 107—57)

This invention relates to new and useful improvements in methods of and means for baking articles of food.

One object of the invention is to provide an improved method and means wherein are combined the advantages of both direct and indirect heating of the articles to be baked, without the attendant disadvantages of such heating, whereby flash heating at the beginning of the baking is eliminated and flooding with steam is adequately accomplished, which cannot be done with direct heating; and also whereby an ample circulation and intensity of heat sufficient to set and quickly bake the article, during the major portion of the baking operation, is provided, and which ordinarily cannot be obtained by indirect heating.

An important object of the invention is to provide a method whereby the articles to be baked are first carried through a steam zone wherein each is subjected to radiant or indirect heat, which gives the loaves or other articles full opportunity to expand in the presence of the steam; then through a direct heat zone in a reverse path, whereby the articles are set and the major portion of the baking is performed under an intense direct heat; and then through an indirect heat zone, whereby the baking is completed, which gives better cooling quality and finish.

A further object of the invention is to provide an oven having an indirect heating and steaming zone or chamber at its top extending rearwardly from the front end; a finishing chamber or zone at its front portion below the first zone and indirectly heated from a refractory fire box located below the finishing chamber and the loading point for the conveyor; together with a refractory flue located between baking and finishing zones or chambers, and discharging into radiating flues in the central and lower portion of said baking chamber; and a baking chamber whereinto products of combustion are directed to intensely heat said chamber.

Another object of the invention is to provide an oven having direct and indirect heating zones and heating flues extending through the same; together with means for controlling the temperatures and the flow of the heat currents.

A construction designed to carry out the invention will be hereinafter described, together with other features of the invention.

Figure 2:
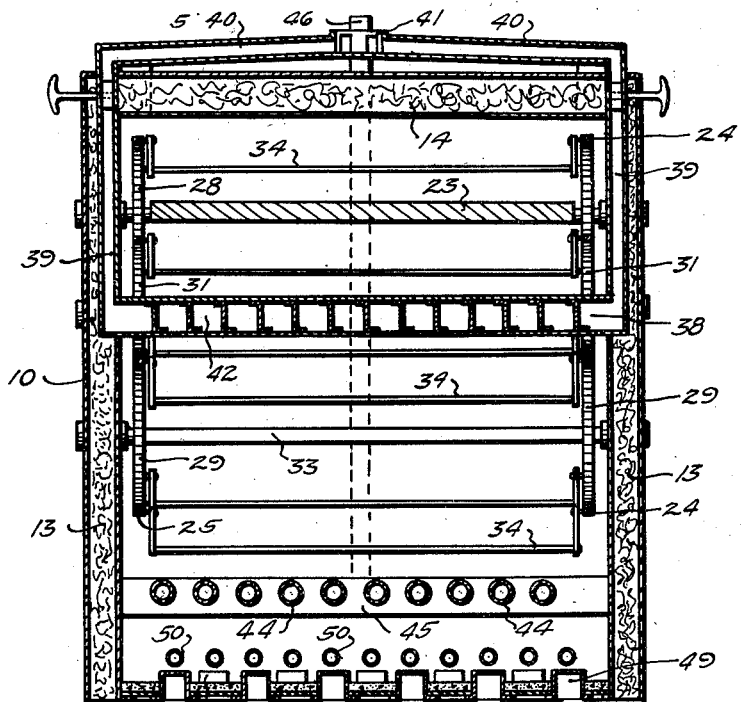
Figure 3:
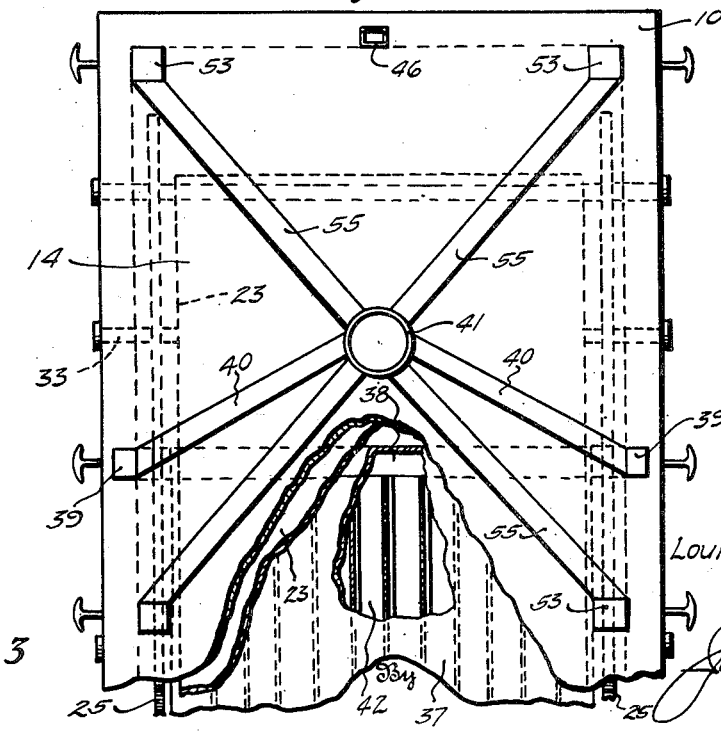

The invention will be more readily understood from a reading of the following specification and by reference to the accompanying drawings in which an example of the invention is shown, and wherein:

Figure 1 is a longitudinal vertical sectional view of an oven constructed in accordance with the invention, Figure 2 is a transverse vertical sectional view taken on the line 2—2 of Figure 1, and Figure 3 is a view of the rear portion of the oven partly in plan and partly in horizontal section.

In the drawings the numeral 10 designates an elongated oven including a front wall 11, a rear wall 12, side walls 13 and a top wall or roof 14. These walls may be of any suitable construction, such as is well-known in the art and the shape of the oven may vary so long as the function of the oven is not defeated. I have found an oven rectangular in cross-section, such as is shown, to give satisfactory results.

In the front wall 11 of the oven is provided a transverse doorway or opening 15, which may be closed by a door 16, particularly when the oven is not in use, because the doorway is open when the oven is in use; although the door may be closed to heat the oven or when desired. An upright flue 17 on the front wall carries off excess heat currents escaping from the opening 15, thereby protecting and saving the baker. At the lower front portion of the oven is located a refractory fire box 18. This box may be fired by blower type of gas burner 19 or any other fuel. The top 20 of the fire box is of refractory material and thereby indirectly heats the chamber or zone A thereabove. The articles to be baked are introduced into this chamber and are also finished and removed from this chamber.

An upright refractory flue 21 is located at the rear of the fire box and extends transversely of the oven. An opening 22 leads from the rear of the fire box into the flue. The flue projects above the box and separates the chamber A from a baking chamber or zone B occupying the rear and major portion of the oven. A transverse partition 23 of refractory material extends longitudinally over the chambers A and B a short distance below the top 14 of the oven to form an indirect heating or expanding chamber or zone C. An endless conveyor 24 is mounted in the oven and includes chains 25 carried by sprockets 26, 27, 28, 29, 30, 31 and 32 on each side of the oven journaled on shafts 33. Swinging trays 34 are carried transversely of the oven between these chains in the usual manner.

The chains travel in the direction indicated by the arrows in Figure 1, and the sprockets are located as shown, whereby loaves or other articles to be baked inserted through the opening 15 are first carried upwardly in the front of the chamber A and thence rearwardly through the chamber C to the rear of the oven, thence downwardly to the bottom of the chamber, thence forwardly, rearwardly and forwardly in said chamber, and finally downwardly and under the sprockets 26 to the opening 15. It will be seen that the loaves will travel a considerable distance in the oven and by driving the chains at the proper rate of speed, said loaves will remain in the oven long enough to be properly baked. Plates 35 extend from the ends of the partition 23 to the shafts 33, between the sprockets 27 and 28 to separate the chamber C from the chambers A and B.

From the upper end of the flue 21 a transverse metal flue 36 extends vertically between the sprockets 32 and under the shaft 33. The flues 21 and 36 co-act in separating the chambers A and B. A transverse flue 37 extends rearwardly from the upper end of the flue 36 into the chamber B at the upper forward portion thereof. This flue connects with a transverse header 38 which connects at each end with upright flues 39 in the side walls 13. Pipes 40 extend from the upper ends of the flues 39 over the roof 14 to a manifold collar 41, which may be connected to a vent pipe (not shown). The flue 37 is located between the two upper runs of the chains 25 in the chamber B and thus the baking loaves are carried under and over said flues. In order to spread the products of combustion and provide for an even distribution of heat, longitudinal ducts 42 are formed in the flue 37. The flues 36 and 37 being of metal constitute radiant heating elements.

A refractory deflector 43 overhangs the opening 22 in the flue 21 and acts to divert some of the products of combustion into longitudinal metallic pipes or ducts 44, extending from the flue 21 to a transverse header 45 mounted against the wall 12 at the bottom of the chamber B. This header discharges into a single upright flue or vent 46. A damper 47 at the bottom of the vent may be swung to open or close the vent. When the damper is closed the products of combustion will flow upwardly in the flue 21 and not through the pipes 44. These pipes being of metal will radiate heat and assist in heating the chamber B.

In the bottom of the chamber B transverse inverted channels 48 supply air from outside the oven. Longitudinal air channels 49 extend across the channels 48 at right angles thereto and receive air therefrom. The tops of the channels 49 are perforated. Two sets of parallel gas burners 50 are mounted over the channels 49 and suitably supplied with gas. A pilot burner 51 extends across the ends of the burners. The burners and air channels are not part of the invention and any heating means may be used, so long as the products of combustion are supplied directly to the chamber B to provide an intense heat.

A steam nozzle 52 is mounted transversely at the top of the front wall 11 close to the roof 14 so as to direct a spray of steam into the front end of the chamber C. Vents 53 are provided in the roof 14 on each side and at the central and rear portions of the expanding chamber C. Dampers 54 mounted in these vents control the escape of the steam, gases and hot air currents from said flue and the oven. Pipes 55 lead from the vents to the collar 41. Dampers and operators therefor may be located wherever found desirable.

The operation of the oven is as follows:

After the oven has been heated by the burners 19 and 50, the conveyor 25 is set in motion and steam is supplied to the nozzle 52. The dampers 54 are adjusted to control the escape of the steam and its flow through the chamber C. By reason of the partition 23, the chamber C may be flooded with steam without affecting the flames of the burners 50. The heat supplied to the chambers A and C is indirect and radiates from the refractory walls of the fire box 18 and flue 21, as well as from the metal walls of the flues 36 and 37. The ducts 42 in the flue 37 assure an equal distribution of the hot air currents passing through said flue. When the damper 47 is closed all of the products of combustion from the fire box 18 will escape into the flue 36. By opening this damper a portion of the products of combustion will pass through the ducts 44, whereby less heat will be radiated by the flues 36 and 37 and more heat will be supplied to the chamber B.

The doorway 15 being open, the baker may conveniently load the trays 34 of the conveyor. While various articles of food may be baked, loaves of bread will be used as an illustration. The loaves are placed on the upwardly moving trays and are immediately carried up into the expanding chamber C. While the loaves are being carried from the front to the rear of the oven through the chamber C, they are subjected to indirect or radiant heating in the presence of steam. This gives the loaves full opportunity to expand and gradually heats them to the proper degree. During this initial baking step the loaves are protected from direct heat as well as heating too quickly.

Upon reaching the rear end of the expansion chamber C, the loaves will be sufficiently hot to enter the baking chamber B and will be carried down to the bottom thereof by the conveyor. The loaves are carried forwardly directly over the ducts 44 and burners 50, thus being subjected to an intense direct heat, as the products of combustion from the burners are flowing upwardly between the trays. The loaves will be "set" and quickly baked in passing forwardly, backwardly and forwardly in this chamber. This step performs the major portion of the baking. It will be noted that the flues 36 and 37 not only supply radiant heat for the chamber A, but also for the upper portion of the chamber C.

The loaves upon leaving the chamber B pass over the flue 37 and enter the chamber A, which may have a lower temperature than the chamber B, but this is not essential. In passing downward and around the sprockets 26, the loaves are gradually cooled and upon arriving at the doorway 15 may be removed from the trays, perfectly baked and finished. Such loaves may be removed into the room temperature without detrimental results.

The description which has been given recites more or less detail of a particular embodiment of the invention, which is set forth as new and useful; however, I desire it understood that the invention is not limited to such exact details of construction, because it is manifest that changes and modifications may be made without departing from the spirit of the invention.

What I claim and desire to secure by Letters Patent, is:

1. A baking oven comprising, a longitudinal partition near the top of the oven defining an expanding chamber above said partition, an upright flue extending between a baking chamber and a finishing chamber, a flue disposed horizontally below the partition and connected to the upright flue, and a conveyor traveling through said chambers.

2. A baking oven comprising, a finishing chamber at its forward portion, a fire box under the finishing chamber having a refractory top for indirectly heating the finishing chamber, a baking chamber, a refractory flue extending upwardly between the finishing chamber and the baking chamber and connected with the fire box, an expanding chamber at the top of the oven overlying the other chambers, metallic flues disposed below the expanding chamber in the upper portion of the baking chamber and connected with the refractory flue, burners in the lower portion of the baking chamber for directly heating the same, and a traveling conveyor extending through the chambers.

3. A baking oven comprising, an upright preheating and finishing chamber at the front end of the oven, a direct heating and baking chamber at the bottom of the oven, an upright transverse wall separating the chambers, an indirect heating flue extending from the upper end of said wall and over-hanging the baking chamber, an indirectly heated expanding chamber extending from the upper end of the preheating chamber rearwardly at the top of the oven, the baking chamber and the finishing chamber communicating between the flue and the expanding chamber above said wall, and an endless carrier travelling up through the preheating chamber, thence rearwardly through the expanding chamber, then downwardly to the baking chamber, then back and forth in the baking chamber, then outwardly between the flue and the expanding chamber to the finishing chamber, and then downwardly in said finishing chamber.

LOUIS D. HOULIS.